United States Patent [19]
Maei

[11] Patent Number: 5,189,695
[45] Date of Patent: Feb. 23, 1993

[54] COMMUNICATION TERMINAL UNIT FOR CONNECTION TO AN ISDN

[75] Inventor: Yoshihiro Maei, Saitama, Japan

[73] Assignee: Fuji Xerox Co., Ltd., Tokyo, Japan

[21] Appl. No.: 757,027

[22] Filed: Sep. 9, 1991

[30] Foreign Application Priority Data

Sep. 10, 1990 [JP] Japan ................................ 2-237142

[51] Int. Cl.$^5$ ...................... H04M 1/66; H04M 11/00; H04J 3/12; H04J 3/24
[52] U.S. Cl. .................. 379/199; 370/110.1; 370/94.1; 379/95; 379/100
[58] Field of Search ............... 379/95, 93, 100, 199, 379/188, 210, 211, 212, 214; 370/110.1, 94.1

[56]  References Cited
U.S. PATENT DOCUMENTS

| 4,961,185 | 10/1990 | Sawada | 379/100 |
| 4,998,248 | 3/1991 | Matsuzaki | 379/100 |
| 5,018,191 | 5/1991 | Catron | 379/211 |
| 5,050,005 | 9/1991 | Kagami | 379/100 |

FOREIGN PATENT DOCUMENTS 64-22196  1/1989  Japan .

OTHER PUBLICATIONS

Xerox 3010 Facsimile Terminal Operator Manual, May 1990.

Primary Examiner—James L. Dwyer
Assistant Examiner—Harry S. Hong
Attorney, Agent, or Firm—Finnegan, Henderson, Farabow, Garrett and Dunner

[57]  ABSTRACT

The present invention relates to communication terminal units connected to an ISDN (Integrated Services Digital Network), and more particularly to a communication terminal unit whose response is limited by a user number, a subaddress and ability specification information included in a call set-up signal sent from a calling terminal. The communication terminal unit of the invention allows an identification code common to terminals in each department to be added, thereby simplifying the number management.

5 Claims, 5 Drawing Sheets

FIG. 4

| A DEPT. | | |
|---|---|---|
| | 100 | 100 |
| TEL | G2/G3 | G4 |

A1

| B DEPT. | |
|---|---|
| | 200 |
| TEL | G2/G3 |

| A DEPT. | | |
|---|---|---|
| 03-111-1111 | 03-111-1111 | 03-111-1111 |
| | 100 | 100 |
| TEL | G2/G3 | G4 |

A1

| B DEPT. | |
|---|---|
| 03-222-2222 | 03-222-2222 |
| | 200 |
| TEL | G2/G3 |

| A DEPT. | | |
|---|---|---|
| 03-111-1111 | 03-111-1111 | 03-111-1111 |
| | 100 | 100 |
| TEL | G2/G3 | G4 |

A1

| | |
|---|---|
| 03-222-2222 | 03-222-2222 |
| 100 | 100 |
| G2/G3 | G4 |

A2

| B DEPT. | | |
|---|---|---|
| 03-333-3333 | 03-333-3333 | 03-333-3333 |
| | 200 | 200 |
| TEL | G2/G3 | G4 |

B2

| | |
|---|---|
| 03-444-4444 | 03-444-4444 |
| | 200 |
| TEL | G2/G3 |

| A·B DEPT. | | | | | |
|---|---|---|---|---|---|
| | 100 | 100 | 100 | | |
| | | | | 200 | 200 |
| TEL | G2/G3 | G4 | TEL | G2/G3 | G4 |

COMMUNICATION TERMINAL UNIT FOR CONNECTION TO AN ISDN

BACKGROUND OF THE INVENTION

The present invention relates to communication terminal units connected to an ISDN (Integrated Services Digital Network), and more particularly to a communication terminal unit whose response is limited by a user number, a subaddress and ability specification information included in a call set-up signal sent from a calling terminal.

In addition to major conventional networks for communication terminal units including telephone service networks and telex service networks, ISDNs which handle digital information are increasingly gaining in popularity in recent years.

The ISDN is an integrated communication network, in which information of a wide variety of communication units, such as telephones, facsimile machines and teletypewriters, connected to a digital service unit (hereinafter referred to as "DSU") through buses is integrated in a digital format and communication services to each communication device are taken care of on a single common number basis. A plurality of communication units can be connected to the DSU.

A call set-up signal of the ISDN may include, other than a user number, a subaddress and ability specification information.

The subaddress is a kind of extension number. If a subaddress is included in a call set-up signal, only a communication unit to which such subaddress is assigned can respond and operate from among a plurality of communication units connected to a DSU.

In addition to its use as an extension number, various other uses have been proposed for the subaddress. For example, in Published Unexamined Japanese Patent Application No. 22196/1989, a multi-functional communication device, such as a telephone serving also as a facsimile machine, assigns subaddresses to each of its functions, so that the concept of a subaddress can be utilized effectively.

The term "ability specification information" means a condition or conditions requested by a calling terminal for a desired communication. For example, if the target communication terminal is a facsimile machine, the ability specification information for this terminal includes terminal characteristics and protocol attributes such as a G3/G2 function, a G4 function and a telephone function. These conditions are set as options at the calling terminal.

The aforesaid conventional system assigns a subaddress to each function. Under such system, if a large establishment in which a plurality of departments have telephones, facsimile machines and multi-functional communication equipment dedicated to themselves, it is required that each terminal unit be given a subaddress unique to the department and function; e.g., "101" to the telephone function for department A, "102" to the G3/G2 function for department A, "103" to the G4 function for department A and "201" to the telephone function for department B. This has entailed the problem of making the number management complicated.

Also, for communication terminal units shared in common by a plurality of departments, their number management becomes irregular, making the number management further complicated.

SUMMARY OF THE INVENTION

An object of the invention is to overcome the above problems and therefore to provide a communication terminal unit capable of accessing a target terminal by means of a simple number management scheme even in cases where a plurality of terminals having the same function are installed.

To achieve the above object, the invention is applied to a communications terminal unit whose response is limited by a call set-up signal sent from an ISDN (Integrated Services Digital Network).

The terminal unit of the invention include number management table storage means storing at least one number management table, the number management table including a user number area, a subaddress area and an accepted ability area for designating at least one ability, user number detection means for detecting a user number included in the call set-up signal, first selector means for selecting at least one number management table storing the user number detected by the user number detection means in a user number area thereof from the number management table storage means, subaddress detection means for detecting a subaddress included in the call set-up signal, second selector means for selecting at least one number management table storing the subaddress detected by the subaddress detection means in a subaddress area thereof from the selected number management table, ability specification detection means for detecting ability specification information included in the call set-up signal, ability judgment means for judging whether or not an ability specified by the ability specification information is designated in the accepted ability area in the number management table selected by the first and second selector means, and call request control means for either accepting or declining a call request in accordance with the results of judgments made by the first and second selector means and the ability judgment means.

BRIEF DESCRIPTION OF THE DRAWINGS

In the accompanying drawings:

FIGS. 4 to 8 are diagrams illustrative of embodiments of the invention.

DESCRIPTION OF THE PREFERRED EMBODIMENTS

Figure 1:
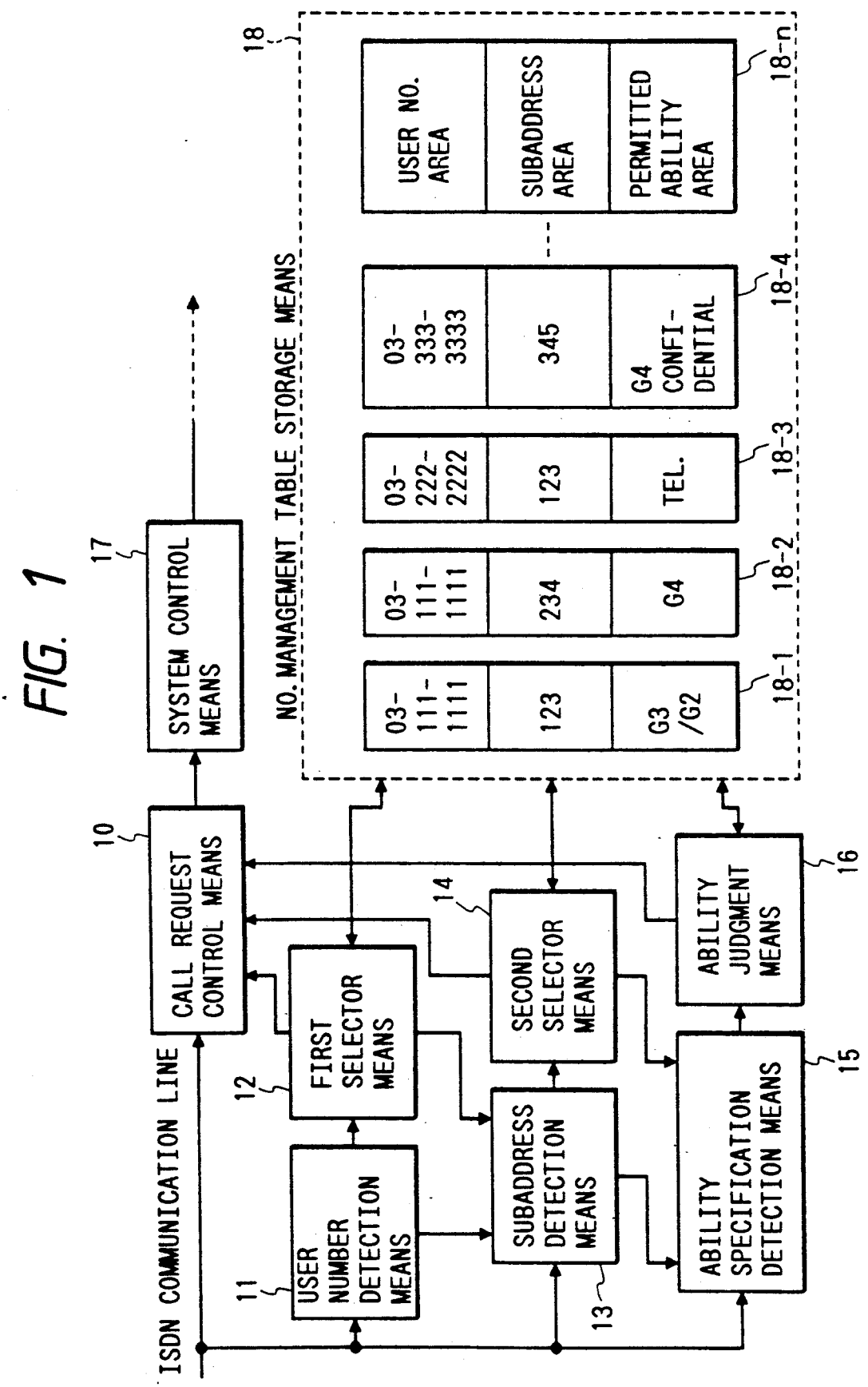
FIG. 1 is a functional block diagram showing a communication terminal unit of the invention.

FIG. 1 is a functional block diagram showing a communication terminal unit of the invention.

In FIG. 1, number management table storage means 18 stores number management tables 18-1 to 18-n.

Each of the number management tables 18-1 to 18-n consists of a user number area, a subaddress area and an accepted ability area, and as will be described below, if a number or code which corresponds to the user number or subaddress included in a call set-up signal from a calling terminal is registered in the user number or subaddress area in a number management table, then an ability which is declared in the accepted ability area in such number management table is used to confirm matching between the calling terminal and a terminal called by the calling terminal.

User number detection means 11, subaddress detection means 13, ability specification detection means 15 and call request control means 10 receive a call set-up signal inputted through an ISDN line.

The user number detection means 11 detects a user number included in the call set-up signal. First selector means 12 selects a number management table or tables registering the detected user number in its or their user number area from the number management table storage means 18.

The subaddress detection means 13 detects a subaddress included in the call set-up signal. Second selector means 14 selects a number management table or tables registering the detected subaddress in its or their subaddress area from the number management table storage means 18.

The ability specification detection means 15 detects ability specification information included in the call set-up signal. Ability judgment means 16 judges whether or not the same ability as the detected ability specification information is designated in the accepted ability area of the number management table selected by the first and second selector means 12, 14.

The call request control means 10 controls the output of a call set-up signal to be applied to system control means 17 in accordance with the results of judgments made by the first and second selector means 12, 14 and the ability judgment means 16.

Figure 2:
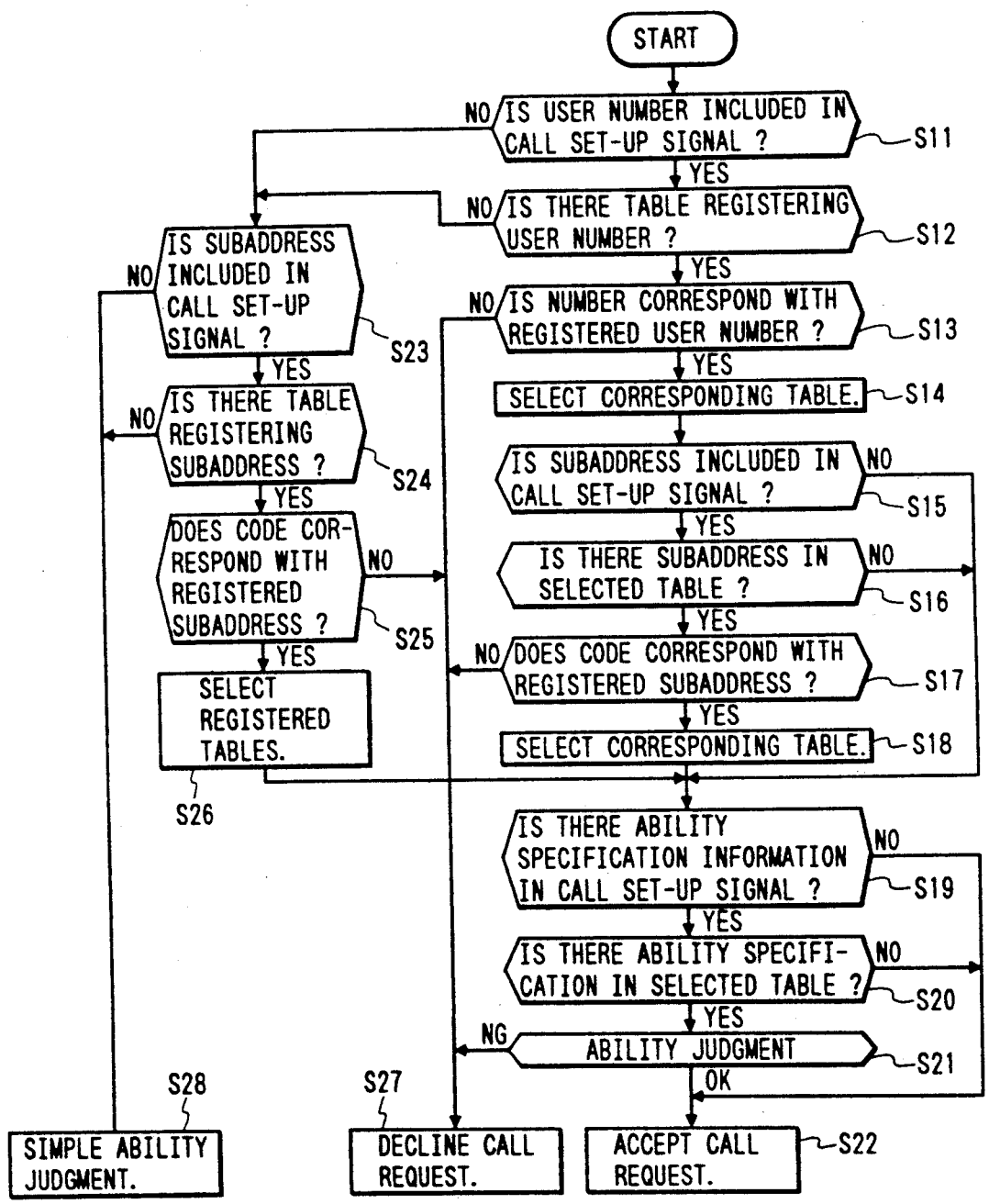
FIG. 2 is a flow chart for the operation of the communication terminal unit shown in FIG. 1.

FIG. 2 is a flow chart illustrative of an operation of the unit shown in FIG. 1. Upon input of a call set-up signal, the presence of a user number included in the call set-up signal is detected by the user number detection means 11 in Step S11. If the user number is detected, then, in Step S12, the presence of a number management table or tables registering the number in its or their user number area is judged by the first selector means 12.

If the number management table or tables registering the number in its or their user number area are found, then the presence of a number management table or tables registering the detected user number in its or their user number area is judged. If the number management table or tables registering the user number are found, such number management table or tables are selected in Step S14.

For example, if the user number detection means 11 has detected a user number "03-111-1111", then the number management tables 18-1, 18-2 are selected.

Also, if there is no number management table registering the detected user number, this processing proceeds to Step S27, where the first selector means 12 controls the call request control means 10 so that the call request will be declined.

In Step S15, the presence of a subaddress included in the call set-up signal is judged by the subaddress detection means 13, and upon detection of the subaddress, the processing proceeds to Step S16; otherwise, it jumps to Step S19.

In Step S16, the presence of a code is judged from the subaddress area of each of the number management tables 18-1, 18-2 selected in Step S14. If the code is registered in a subaddress area, the processing proceeds to Step S17; otherwise it jumps to Step S19.

In Step S17, the presence of a code which corresponds to the detected subaddress is judged from the subaddress area of each of the number management tables 18-1, 18-2 selected in Step S14. If a number management table or tables have the corresponding code, such number management table or tables are subjected to further selection in Step S18.

For example, if the subaddress detection means 13 has detected a subaddress "234", the number management table 18-2 will be further selected.

Also, if no code corresponding to the detected subaddress is present, the processing jumps to Step S27, where the second selector means 14 controls the call request control means 10 so that the call request will be declined.

In Step S19, ability specification information included in the call set-up signal is detected by the ability specification information detection means 15. If the ability specification information is detected, the processing proceeds to Step S20; otherwise, it jumps to Step S22.

In Step S20, the presence of the ability specification is judged from the accepted ability area of the number management table 18-2 selected in Step S18. If there is such ability specification, the processing proceeds to Step S21; if there is no such ability specification, the processing jumps to Step S22.

In Step S21, whether or not the detected ability specification information is an ability which has been declared in the accepted ability area is judged by the ability judgment means 16. If it is the declared ability, the ability judgment means 16 controls the call request control means 10 in Step S22 so that the call request will be accepted. If the ability has not been declared, the ability judgment means 16 controls the call request control means 10 in Step S27 so that the call request will be declined.

For example, let it be supposed that the detected ability specification information is a G4 function. Now, since the G4 function is declared in the accepted ability area of the number management table 18-2, the ability judgment means 16 controls the call request control means 10 so that the call request will be accepted, while if the ability specification information indicates the telephone function, the call request will be declined.

The number of abilities which can be declared simultaneously in each accepted ability area is not limited to only one, but it may be so arranged that a plurality of abilities are declared.

On the other hand, if it is judged in Step S11 that no user number is included in the call set-up signal, or if it is judged in Step S12 that there is no table registering the user number, then the presence of a subaddress included in the call set-up signal is detected by the subaddress detection means 13 in Step S23.

Upon detection of the subaddress, the presence of a number management table or tables registering a code in its or their subaddress area is judged in Step S24. If there is such a number management table or tables registering the code, the presence of a number management table or tables registering the code corresponding to the detected subaddress in its or their subaddress area is judged in Step S25.

If there is such a number management table or tables having the registration, such number management table or tables are selected in Step S26, and the processing jumps to Step S19 thereafter. On the other hand, if there is no such number management table or tables having the registration, the ability judgment means 16 controls the call request control means 10 in Step S27 so that the call request will be declined.

If it is judged in Step S23 that no subaddress is included in the call set-up signal, or if it is judged in Step S24 that there is no table registering the subaddress, then the processing jumps to Step S28, where a general and simple ability judgment unrelated to the ability specification information will be executed.

Figure 3:
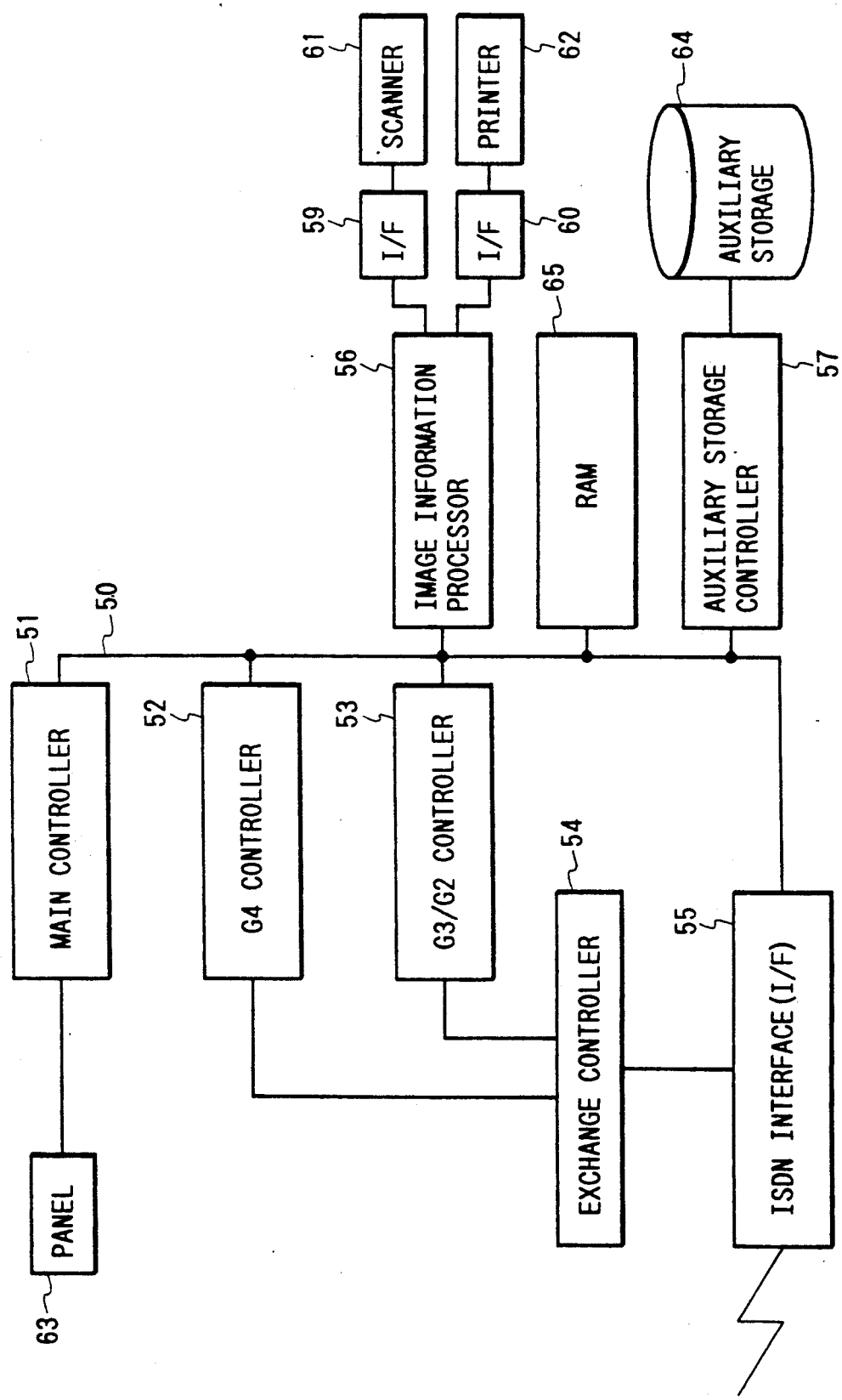
FIG. 3 is a block diagram of a facsimile machine, which is an embodiment of the invention.

FIG. 3 is a block diagram showing a facsimile machine, which is an embodiment of the invention.

In FIG. 3, a main controller 51, a G4 controller 52, a G3/G2 controller 53, an exchange controller 54, an image information processor 56, an auxiliary storage controller 57, a RAM (random access memory) 65 and an ISDN interface 55 are connected to a bus 50.

An operation panel 63 is connected to the main controller 51, while an auxiliary storage unit 64 is connected to the auxiliary storage controller 57. A scanner 61 and a printer 62 are connected to the image information processor 56 through interfaces 59, 60, respectively.

The number management tables 18-1 to 18-n are pre-registered in the RAM 65. The content of each number management table may be added or corrected by operation of the operation panel 63 by an operator. The content of each number management table may also be outputted from the printer 62 by operating the operation panel 63.

Under such configuration, upon input of a call set-up signal to the ISDN interface 55, the main controller 51 detects a user number, a subaddress and ability specification information included in the call set-up signal, and then judges in the aforesaid manner whether or not the call request must be accepted or declined by referencing the number management tables 18-1 to 18-n registered in the RAM 65.

The result of the judgment is applied to the ISDN interface 55, and if the call request is accepted, the exchange controller 54 applies a signal to either the G4 controller 52 or the G3/G2 controller 53 so that a communication begins. On the other hand, if the call request is declined, the ISDN interface 55 does not respond to the call set-up signal, and thus this call is ended.

FIGS. 4 to 7 are diagrams illustrative of methods of using communication terminal units of the invention. To facilitate the understanding of the invention, each communication terminal unit is schematically represented as a number management table. Similar to FIG. 1, each number management table consists of the following three areas arranged from top to bottom: a user number area; a subaddress area; and an accepted ability area.

In a first embodiment shown in FIG. 4, a department A has a terminal A1 which is equipped with the telephone function, the G2/G3 function and the G4 function, while a department B has a terminal B1 which is equipped with the telephone function and the G2/G3 function.

Under such configuration, if one wishes to communicate with department A by facsimile in the G4 mode, then the calling terminal not only specifies a G4-mode facsimile communication, but also inputs the user number and the subaddress "100".

The called terminal A1 of department A, if its subaddress is "100", judges that the call request is directed to itself. And it further judges the ability specification information included in that call set-up signal.

The ability specification information indicates that the desired communication is a G4-mode facsimile communication. Since "G4" is declared in the accepted ability area of the called terminal A1, the facsimile communication in G4 mode is accepted and started.

Similarly, if one wishes to start a telephone communication with department A, the calling terminal not only specifies a telephone communication, but also inputs the user number and the subaddress "100".

The called terminal A1 of department A, if its subaddress is "100", similarly judges the ability specification information included in that call set-up signal.

The ability specification information indicates that the desired communication is a telephone communication. Since "TEL" is declared in the accepted ability area of the called terminal A1, the telephone communication is accepted and started.

On the other hand, if one wishes to communicate with department B by facsimile in the G4 mode, the calling terminal not only specifies a G4-mode facsimile communication, but also inputs the user number and the subaddress "200".

The called terminal B1 of department B, if its subaddress is "200", judges that the call request is directed to itself, and further judges the ability specification information included in that call set-up signal.

The ability specification information indicates that the desired communication is a G4-mode facsimile communication. Since "G4" is not declared in the accepted ability area of the called terminal B1, the call request for the G4-mode facsimile communication will be declined.

This embodiment allows users to communicate as desired with a simple input of a subaddress which is common to each department.

FIG. 5 is a diagram illustrative of a second embodiment of the invention. In the second embodiment, departments are identified by the user number instead of the subaddress.

The configuration of this embodiment is similar to that of the embodiment shown in FIG. 4, and since its operation is apparent, the description thereof will be omitted.

FIG. 6 is a diagram illustrative of a third embodiment of the invention. In this embodiment, each department has a plurality of terminals and each terminal includes a common function.

If each department has a plurality of terminals, each of which includes a common function, then there is a contention among these terminals at the time such common function is called for and only a terminal which happens to respond first is selected for the execution of the communication. This means that a calling terminal cannot specify a called terminal, thereby not allowing the calling terminal to call only a desired called terminal without fail.

To overcome this problem, the third embodiment has a feature that a user number unique to each terminal by the department is assigned so that a calling terminal can specify a called terminal.

Specifically, if one wishes to communicate with the terminal A1 of department A by facsimile in the G4 mode, the calling terminal not only specifies a G4-mode facsimile communication, but also inputs the user number "03-111-1111" and the subaddress "100".

Similarly, if one wishes to communicate with a terminal A2 of department A by facsimile in the G4 mode, the calling terminal not only specifies a G4-mode facsimile communication, but also inputs a user number "03-222-2222" and the subaddress "100".

On the other hand, if one wishes to communicate with a terminal B2 of department B by facsimile in the G4 mode, the calling terminal not only specifies a G4- mode facsimile communication, but also inputs a user number "03-333-3333" and a subaddress "200".

This embodiment allows a calling terminal to specify a desired called terminal even if each of the departments has a plurality of terminals and each of these terminals includes a common function.

FIG. 7 is a diagram illustrative of a fourth embodiment of the invention. In this embodiment, departments A and B share a terminal C1 in common.

Under such a configuration, if one wishes to communicate with department A by facsimile in the G4 mode, the calling terminal not only specifies a G4-mode facsimile communication, but also inputs the user number and the subaddress "100".

Similarly, if one wishes to communicate with department B by facsimile in the G4 mode, the calling terminal not only specifies a G4-mode facsimile communication, but also inputs the user number and the subaddress "200".

This embodiment allows the calling terminal to communicate without being aware of the fact that departments A and B share the terminals in common.

Figure 8:
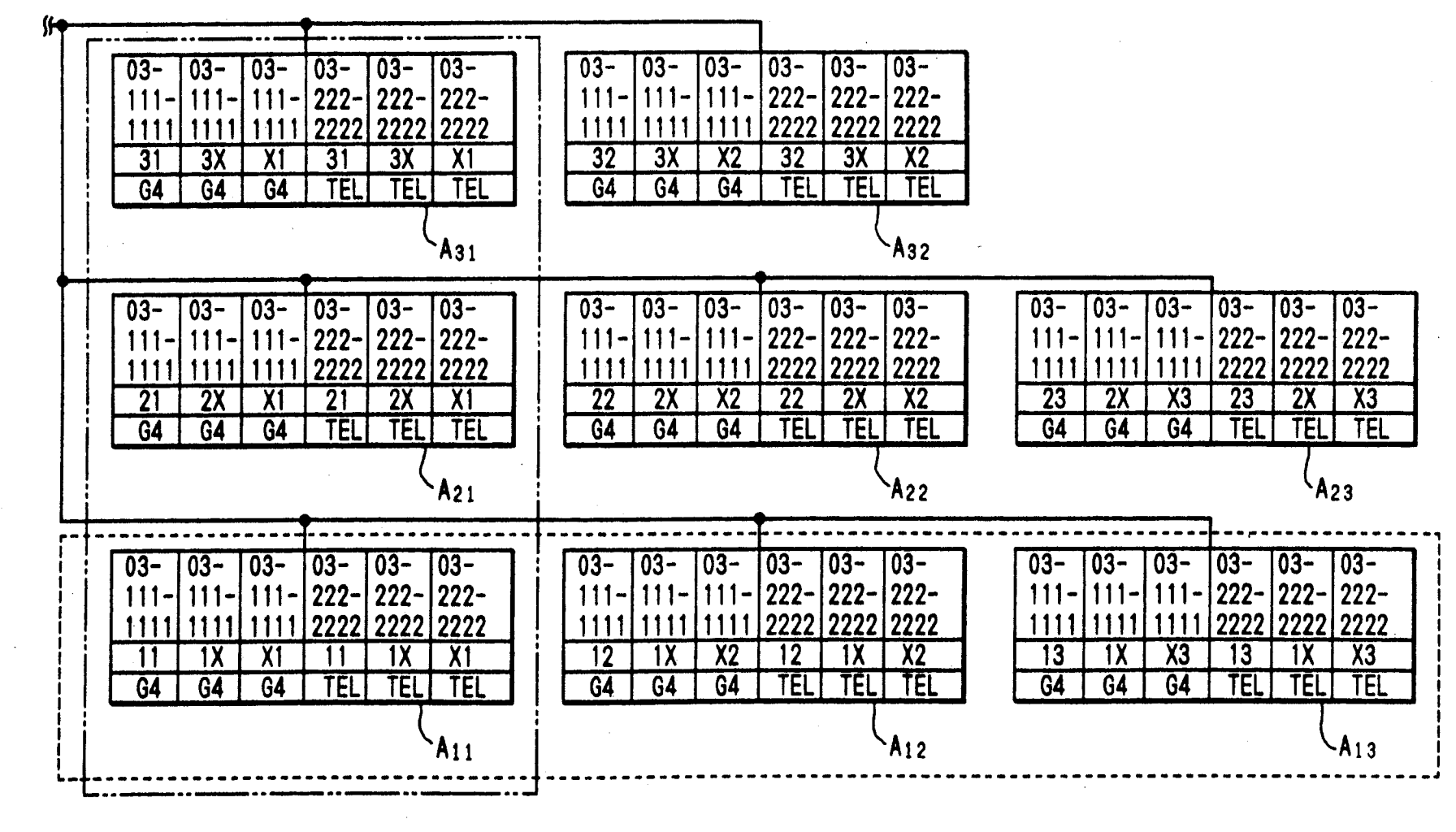

FIG. 8 is a diagram showing the registered contents of number management tables of eight (8) communication terminal units $A_{11}$ to $A_{32}$ which are connected to a single digital service line.

In this embodiment there is a correspondence between the accepted ability of each terminal and a user number. A user number "03-111-1111" corresponds to the G4 function; a user number "03-222-2222" corresponds to the telephone function.

Under such a configuration, if one wishes to begin a G4-mode facsimile communication by specifying the terminal $A_{11}$, the calling terminal inputs both the user number "03-111-1111" and a subaddress "11". Since it is only the terminal $A_{11}$ that registers such user number and such subaddress, only the terminal $A_{11}$ responds.

Also, if one wishes to begin a G4-mode facsimile communication with either one of the terminals $A_{11}$, $A_{12}$, $A_{13}$, the calling terminal inputs both the user number "03-111-1111" and the subaddress "1X". Since it is only these three terminals $A_{11}$, $A_{12}$, $A_{13}$ that register such user number and such subaddress, only these three terminals respond and only one of them is selected.

Further, if one wishes to begin a G4-mode facsimile communication with either one of the terminals $A_{11}$, $A_{21}$, $A_{31}$, the calling terminal inputs both the user number "03-111-1111" and the subaddress "X1". Since it is only these three terminals $A_{11}$, $A_{21}$, $A_{31}$ that register such user number and such subaddress, these terminals respond and only one of them is selected.

Similarly, if one wishes to begin a telephone communication by specifying the terminal $A_{11}$, the calling terminal inputs both the user number "03-222-2222" and the subaddress "11".

However, even if a facsimile communication in the G4 mode is to be performed by inputting the user number "03-222-2222" and the subaddress "11" and by specifying the terminal $A_{11}$, no "G4" is declared in the accepted ability area of the number management table specified by the user number and the subaddress. Therefore, this call request will be declined.

This embodiment allows each communication terminal to register a user number and a subaddress which are unique to itself. Therefore, a calling terminal can communicate with a desired terminal in accordance with the user number and the subaddress or call a plurality of desired terminals grouped in advance by the subaddress and select one of them.

Hence, the application of the invention to a lace-scale establishment having both a plurality of subscribed user numbers and a multiplicity of communication terminals will allow various user needs to be accommodated by, e.g., selectively calling a specific terminal or terminals and calling either one of a plurality of terminals installed in a desired department.

As is apparent from the foregoing description, the invention allows an identification code common to terminals in each department to be added, thereby simplifying the number management.

In addition, the invention allows a called terminal or terminals to be specified by the user number, the subaddress and the ability specification information, and this makes it possible for a calling terminal to specify a desired called terminal or terminals.

What is claimed is:

1. A communication terminal unit whose response is limited by a call set-up signal sent from an ISDN (Integrated Services Digital Network), said communication terminal unit comprising:
   number management table storage means for storing at least one number management table, said number management table including a user number area, a subaddress area, and an accepted ability area for designating at least one ability;
   user number detection means for detecting a user number included in said call set-up signal;
   subaddress detection means for detecting a subaddress included in said call set-up signal;
   selector means for selecting at least one number management table storing both the user number detected by said user number detection means in a user number area of said at least one number management table and the subaddress detected by said subaddress detection means in a subaddress area of said at least one number management table;
   ability specification detection means for detecting ability specification information included in said call set-up signal;
   ability judgment means for judging whether an ability specified by said ability specification information is designated in an accepted ability area of said at least one number management table selected by said selector means; and
   call request control means for either accepting or declining a call request in accordance with the results of the selection made by said selector means and the judgement made by said ability judgment means.

2. The communication terminal unit according to claim 1, wherein said number management table storage means includes a RAM (random access memory), said RAM including at least one of the user number area, the subaddress area, and the accepted ability area.

3. The communication terminal unit according to claim 2, further comprising operating means for editing the content of said RAM.

4. The communication terminal unit according to claim 3, further comprising printing means for printing data representing the contents of said RAM.

5. The communication terminal unit according to claim 2, further comprising printing means for printing data representing the contents of said RAM.

* * * * *